SUPPORT STANDS

Original Filed July 18, 1960 2 Sheets-Sheet 1

INVENTOR;
CLAYTON A. LAUGHLIN.

BY Robert M. Dunning

ATTORNEY

SUPPORT STANDS

Original Filed July 18, 1960 2 Sheets-Sheet 2

INVENTOR;
CLAYTON A. LAUGHLIN.

BY Robert M. Dunning
ATTORNEY

United States Patent Office

Re. 26,070
Reissued Aug. 2, 1966

26,070
SUPPORT STANDS

Clayton A. Laughlin, Minneapolis, Minn., assignor to Infanseat Company, Eldora, Iowa, a corporation of Iowa Original No. 3,101,972, dated Aug. 27, 1963, Ser. No. 200,685, June 7, 1962, which is a continuation of Ser. No. 43,493, July 18, 1960. Application for reissue Sept. 2, 1964, Ser. No. 407,268

Matter enclosed in heavy brackets [ ] appears in the original patent but forms no part of this reissue specification; matter printed in italics indicates the additions made by reissue.

12 Claims. (Cl. 297—377)

This application is a continuation of my prior application Serial No. 43,493, filed July 18, 1960, entitled "Support Stands," now abandoned. The invention relates to support stands and deals particularly with stands designed to support baby carriers of the type having an elongated back, opposed sides extending forwardly from the back, and a bottom connected to the sides and back. This type of carrier is preferably a one piece structure of molded plastic and is designed to support a baby when desired during the period from the age of birth to over a year old. Heretofore, it was necessary to prop the carrier up against some object such as a conventional chair or up against the wall. Oftentimes a baby's natural tendencies to squirm and kick would necessitate the use of tie straps or cords to hold the carrier in the proper position. This operation of necessity reduced the convenience of the carrier.

It is the primary object of this invention to increase the utility of the baby carrier by providing a supporting stand which is adjustably connected to the carrier in such a way as to support the child in any of a series of positions and to provide a stand which will support the baby comfortably and safely in the carrier.

A feature of this invention resides in the provision of a supporting stand which will support a baby carrier in any of a variety of positions, allowing the baby to lie flat or to be set up at any desired angle.

Another feature of this invention is the provision of a supporting stand for a baby carrier which is formed of a heavy gauge steel for rigid support of the carrier. The use of the stand in conjunction with the baby carrier enables the carrier to be used in a wide variety of situations. For instance the carrier may be used as an attachment to a car seat, as a high chair when placed on a table, or in a stroller. The use of the stand with the carrier enables a mother to prop the baby up in the carrier safe and comfortable nearby while she goes about her housework.

These and many more objects and novel features will become apparent from the following description taken in connection with the drawing wherein.

Figure 1:
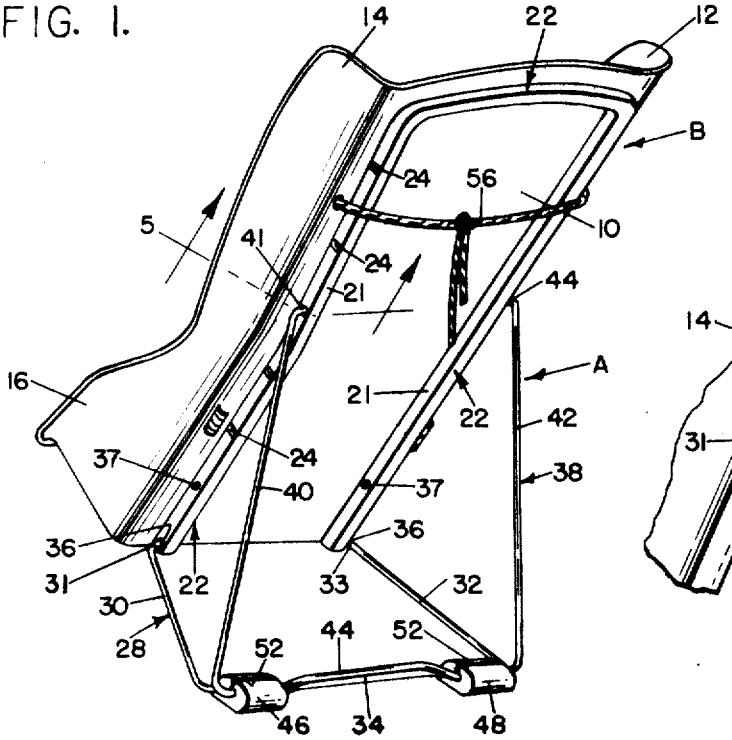
FIGURE 1 is a perspective view of the back of a baby carrier showing the supporting stand attached thereto.
Figure 3:
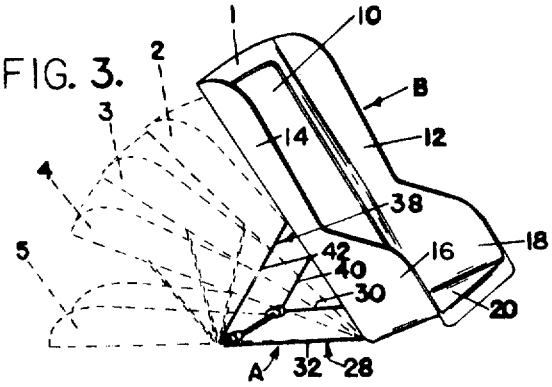
FIGURE 3 is a perspective view of the carrier and stand illustrating in broken lines the manner in which the carrier is made adjustable to various positions.

The supporting stand is generally indicated by the letter A and in FIGURES 1 and 3 is shown attached to a baby carrier B. The back construction of the carrier is preferably formed to especially accommodate the use of the new invention.

The carrier shown includes an elongated back panel 10 having integrally formed side panels 12 and 14. The side panels extend forwardly as at 16 and 18 and are integrally connected to a bottom 20. Said bottom, as seen in FIGURE 3, has a downwardly depending skirt portion, at the front end thereof, to limit forward tipping. The baby carrier of the type illustrated is normally a one piece molded structure formed of a comparatively rigid plastic substance.

Figure 4:
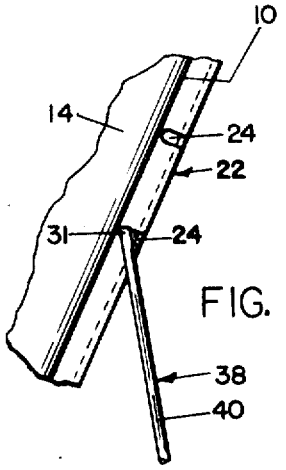
FIGURE 4 is an enlarged fragmentary view of a portion of the carrier back and sides showing the apertures therein and the disposition of the frame ends.
Figure 2:
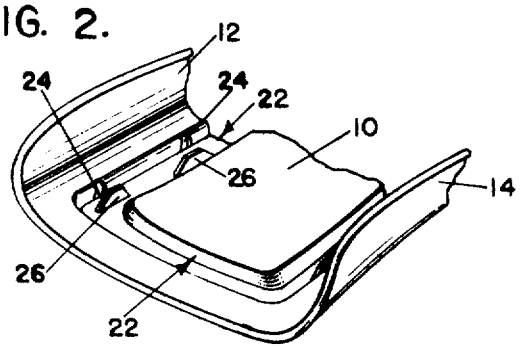
FIGURE 2 is an enlarged fragmentary perspective view of a portion of the inside of the carrier back.

As best seen in FIGURES 1 and 4 the rib portions 21 are provided with a series of sockets or apertures, the apertures in the rib on one rib portion 21 being aligned laterally with the apertures in the opposite rib portion 21.

The rib 22 is generally channel shaped in cross section, and the apertures 24 extend laterally through the outer wall of each rib portion 21 which is nearest the adjacent side edge of the back panel. Each rib portion 21 is provided with a series of lugs or stops 26 projecting forwardly from the base of the channel-shaped rib in aligned relation with the aperture 24.

The carrier support A includes a base or lower frame generally indicated by the numeral 28. The frame 28 is a generally U-shaped rod formed of a relatively heavy gauge steel material. The arms 30 and 32 of the frame are similar in length and converge towards each other somewhat from a connecting cross arm 34. The terminal ends 31 and 33 of the arms 30 and 32 respectively are bent inwardly in opposed aligned relation and are pivotally inserted into aligned journals or apertures 36 at the lower ends of the rib portions 21 which terminate at the juncture of the back and bottom of the carrier. The aligned apertures 37 are provided in the rib portion 21 so that the frame 28 may be journalled therein. In certain situations, such as when the baby carrier is placed upon an automobile cushion, this feature adds to the overall stability of the baby carrier.

The base frame 28 is sufficiently resilient to permit the spreading apart of the arms and to permit engagement with the apertures 37.

Figure 5:
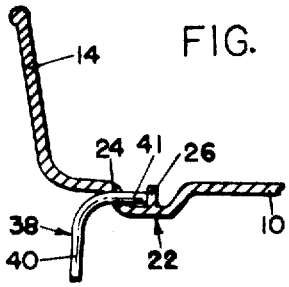
FIGURE 5 is an enlarged transverse sectional view of a portion of the carrier back and one side, said section being taken substantially on line 5—5 of FIGURE 1.

The carrier support A includes a second or upper frame generally indicated by the numeral 38. This frame includes a pair of resilient arms 40 and 42 of similar length which are connected at one end by a cross arm 44, the other or terminal ends 41 and 43 of the arms 40 and 42 respectively are bent at substantially right angles into aligned relation and are adapted to *be* [the] pivotally inserted into the apertures 24 as is best seen in FIGURES 1, 4 and 5. The free terminal ends 31 and 33 of the frame 28 and the terminal ends 41 and 43 of the frame 38 are normally closer together than they are when inserted into the apertures. This inherent resiliency causes the arms to pull towards each other and against the lugs or stops 26. [from] *From* the above description it will be seen that arms 30, 32 and 40, 42 form preloaded springs in that on each pair being forced apart to enter aligned apertures or sockets, they exert a pressure on stops 26.

Figure 6:
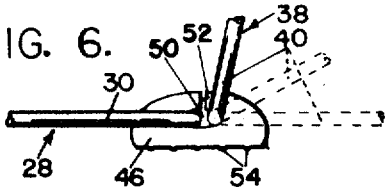
FIGURE 6 is a side elevational view of the bearing blocks showing the disposition of the frames therethrough.

The frame 28 and the frame 38 are pivotally connected and angularly related to each other as best seen in FIGURES 1 and 6. This connection is made by a pair of bearing blocks 46 and 48 or the like which are formed of comparatively hard rubber substance or the like. The blocks 46 and 48 encircle the side by side cross arms 34 and 55 adjacent the bend in the frames connecting the connecting members and the arms and said blocks lie between said pairs of arms 30, 32 and 40, 42. The blocks will remain in this position because the intermediate portions of the cross arms are both bent offset as seen in FIGURE 1. The blocks 46 and 48 are somewhat oval in cross section and are provided with an internal lateral opening 50. Access to the opening is gained by providing a slit 52 across the top of each block. The lower surfaces of the blocks are somewhat flat and may be provided with ribs 54 to provide a better grip upon the floor or other surface which the baby carrier is resting. Since the frame members converge inwardly from the connecting members, as noted above and shown in FIGURE 1, the frames have a generally trapezoidal form with a broad base, the two bases lying adjacent each other.

As best illustrated in FIGURE 3 the angular position of the carrier may be changed by inserting the arms 40 and 42 of the frame 38 into the various apertures along the seat back. The older the baby becomes the more able he is to sit in a more erect position. Ideally position 1 is most healthful and comfortable for a baby from 8 months to a year. Position 2 for babies 6 to 8 months, position 3 for 3 to 6 months, position 4, birth to 3 months, and position 5 for sleeping and carrying the infant.

When the frame 38 is disposed in the uppermost apertures both the frames 38 and 28 will be folded flat against the outer surface of the back 10. Thus, necessarily, the vertical length of frame 38 plus frame 28 is the same as the vertical length between the uppermost and lowermost sockets and somewhat less than the total vertical length of the back 10.

The carriers are normally provided with a cord 56 which may be tied to a car seat for example, for added safety.

Figure 7:
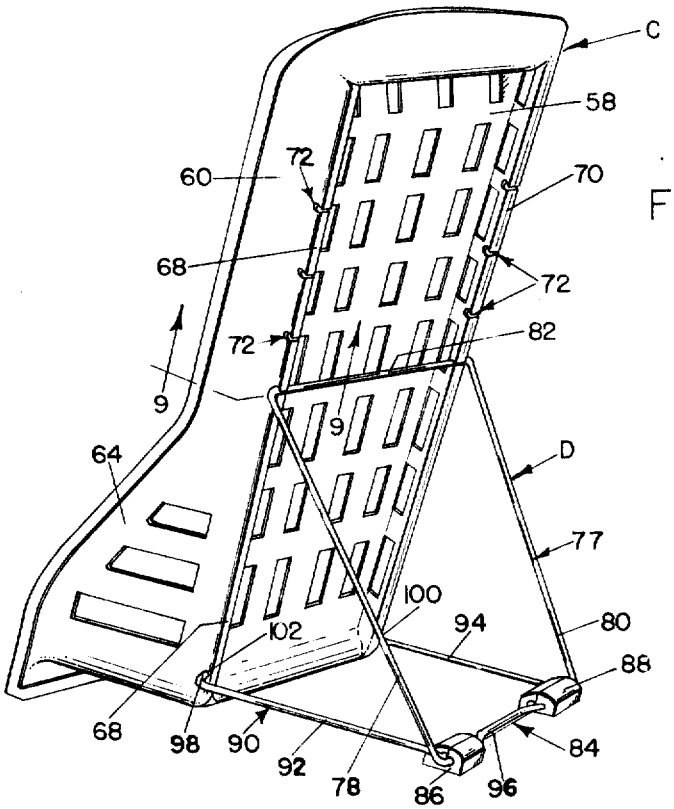
FIGURE 7 is a perspective view of a baby carrier and a supporting stand attached thereto, showing another embodiment of the invention.
Figure 8:
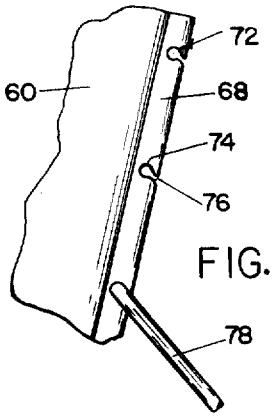
FIGURE 8 is an enlarged fragmentary view of a portion of the carrier back panel and sides showing notches disposed therein.
Figure 9:
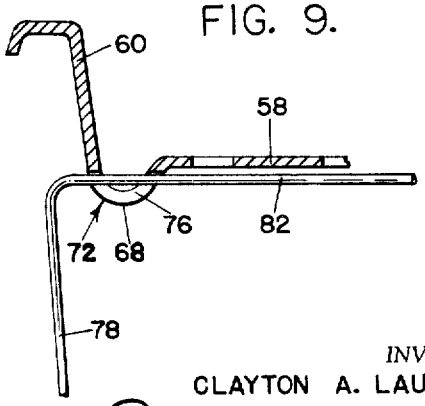
FIGURE 9 is an enlarged transverse sectional view of a portion of the carrier back panel and one side, said section being taken substantially on line 9—9 of FIGURE 7.

A modification of the carrier supporting stand is illustrated in FIGURES 7, 8, and 9. The carrier, generally indicated by the letter C is provided with a back 58 which is specifically shaped to accommodate a modified form of a support stand generally indicated by the letter D. The carrier C is preferably formed of a material which is somewhat pliable as compared to the material utilized in the formation of seat B illustrated in FIGURES 1 through 6.

The carrier C includes an elongated perforated or slotted back panel 58 having integrally connected forwardly extending sides 60. The side panels 60 flare outwardly at their lower ends forming slotted panels 64. A bottom, not specifically illustrated is attached to the side and back panels at the lower ends thereof.

As best seen in FIGURES 7 and 9 a pair of opposed ribs 68 and 70 are formed at the connecting juncture between the sides 60 and the back panel 58. These ribs 68 and 70 are formed integrally with the sides and back panel. Each rib, which is generally semi-circular or channel shaped in cross section, is provided with a series of notches or cut-outs 72 which are arranged in transversely aligned relation with the notches in the opposite rib. As is most clearly seen in FIGURE 8 the major portion of each notch is circular as at 74, the entrance 76 to each notch being considerable smaller in width than the circular portion of each notch. The particular purpose of the above described arrangement will be described later.

The carrier supporting stand D includes a support frame which is generally rectangular in shape and is formed of a relatively heavy gauge steel rod material. As shown in FIGURE 8, the diameter of the rod is substantially equal to that of the circular portion 74 of notches 72 and is larger than the minimum width of entrance 76. Side arms 78 and 80 extend substantially parallel from connecting cross arms 82 and 84. The cross arm 82 is designed to be inserted into the circular portions 74 of aligned notches 72 by pushing the arms through entrance 76. Once snapped in place the arm resists accidental displacement from circular portions 74 of notches 72. The arm will transversely bridge the back of the back panel 58, the arms 78 and 80 extending angularly therefrom. The cross arm 84 is provided with an offset intermediate portion designed to prevent a pair of oppositely disposed bearing blocks 86 and 88 from moving towards each other. These blocks are similar to the blocks 46 and 48 described earlier in this specification.

The support stand further includes a base frame 90 which is substantially identical with the base frame 28 as shown in FIGURE 1. The arms 92 and 94 of the frame are similar in length and extend in substantially parallel relation from a cross arm 96. The [terminal] ends 98 and 100 of the arms 92 and 94 respectively, are bent inwardly in opposed aligned relation and are inserted into aligned apertures or sockets 102 at the lower ends of the ribs 68 and 70. FIGURE 7 shows the sockets 102 to lie lower than the lowermost of said perforations. The frame 90 is pivotally connected to the frame 77 by the blocks 86 and 88, the cross arm 96 being inserted in the blocks in side by side relation with the cross arm 84 of the frame 77.

The angular position of the carrier may be changed similar to the manner in which the positions are changed in the embodiment shown in FIGURES 1 through 6. To adjust the carrier the cross arm 82 may be withdrawn from the notches 72 by forcing the arm out through the notch entrances 76 and reinserting the arm into the desired transversely aligned notches. When the cross arm 82 is disposed in the uppermost notches both the frames 77 and 90 will be folded flat against the outer surface of the back 58.

In accordance with the patent statutes, I have described the principles of construction and operation of my improvement in support stands, and while I have endeavored to set forth the best embodiment thereof, I desire to have it understood that changes may be made within the scope of the following claims without departing from the spirit of my invention.

I claim:

1. A baby carrier comprising:

a back with lower and upper connector means on the rear thereof providing at the lower part of the back means for pivotal connection to a support and providing at the portion of the back thereabove a plurality of transversely aligned pairs of lateral sockets spaced apart along the length of the back or selective adjustable connection to a support, and a bottom connected to the back extending forwardly therefrom a substantial distance compared to the length of the back of the carrier, said baby carrier further comprising a support including:

a base member having means thereon for making tension-taking pivotal connection with the lower connector means on the back of the carrier, a brace member comprising a U-shaped frame of resilient rod-like material having side arms and a cross piece connecting one end thereof, *the distance separating said one end of said side arms approximating the width of said carrier,* means pivotally connecting the cross piece of the U-shaped frame with the base member in tension taking relationship, and said frame having laterally extending pins formed at the other end of the arms thereof adapted selectively to engage the lateral sockets of the upper connector means on the back of the carrier, the length of the back of the carrier being as great as the combined lengths of the base and brace *members, and the distance separating the uppermost of*

*said lateral sockets from said lower connector means approximating said combined lengths of said base and brace members.*

2. *A baby carrier comprising:*

*a back with lower and upper connector means on the rear thereof providing at the lower part of the back means for pivotal connection to a support and providing at the portion of the back thereabove a plurality of transversely aligned pairs of lateral sockets spaced apart along the length of the back for selective adjustable connection to a support, and*

*a bottom connected to the back extending forwardly therefrom a substantial distance compared to the length of the back of the carrier,*

*said baby carrier further comprising a support including:*

*a base member having means thereon for making tension-taking pivotal connection with the lower connector means on the back of the carrier,*

*a brace member comprising a U-shaped frame of resilient rod-like material having side arms and a cross piece connecting one end thereof,*

*means pivotally connecting the cross piece of the U-shaped frame with the base member in tension taking relationship, and*

*said frame having laterally extending pins formed at the other end of the arms thereof adapted selectively to engage the lateral sockets of the upper conductor means on the back of the carrier,*

*the length of the back of the carrier being as great as the combined lengths of the base and brace members,*

[Combination according to claim 1] wherein said sockets of said upper connector means are spaced inwardly from the side edges of said back of the baby carrier, and said U-shaped frame is trapezoidal in shape with the cross piece forming the base of the trapezoid being of the same width as the back of the baby carrier midway of the length thereof.

3. *A baby carrier comprising:*

*a back with lower and upper connector means on the rear thereof providing at the lower part of the back means for pivotal connection to a support and providing at the portion of the back thereabove a plurality of transversely aligned pairs of lateral sockets spaced apart along the length of the back for selective adjustable connection to a support, and*

*a bottom connected to the back extending forwardly therefrom a substantial distance compared to the length of the back of the carrier,*

*said baby carrier further comprising a support including:*

*a base member having means thereon for making tension-taking pivotal connection with the lower connector means on the back of the carrier,*

*a brace member comprising a U-shaped frame of resilient rod-like material having side arms and a cross piece connecting one end thereof,*

*means pivotally connecting the cross piece of the U-shaped frame with the base member in tension taking relationship, and*

*said frame having laterally extending pins formed at the other end of the arms thereof adapted selectively to engage the lateral sockets of the upper connector means on the back of the carrier,*

*the length of the back of the carrier being as great as the combined lengths of the base and brace members,*

[Combination according to claim 1] wherein each said lateral socket is formed by an aperture extending all the way through a rearwardly displaced portion of the back of the carrier and stop means limiting the degree of penetration into the aperture of a pin on a side arm of the U-shaped frame when said pin is engaged with the socket, the distance from the stop means to the mouth of the socket being less than the length of the pins.

4. Combination according to claim 3 wherein said laterally extending pins on the side arms of the U-frame point inwardly and the lateral distance between said stop means of each said pair of sockets is greater than the distance between the ends of said pins when the U-frame is in unstressed condition, whereby said pins press resiliently against said stop means of the sockets with which they engage so as to resist accidental disengagement thereof.

5. Combination of claim 3 wherein said back of the carrier includes a pair of rearwardly extending channels running lengthwise thereof along its sides, said apertures being formed in the outer walls of said channels.

6. *A baby carrier comprising:*

*a back with lower and upper connector means on the rear thereof providing at the lower part of the back means for pivotal connection to a support and providing at the portion of the back thereabove a plurality of transversely aligned pairs of lateral sockets spaced apart along the length of the back for selective adjustable connection to a support, and*

*a bottom connected to the back extending forwardly therefrom a substantial distance compared to the length of the back of the carrier,*

*said baby carrier further comprising a support including:*

*a base member having means thereon for making tension-taking pivotal connection with the lower connector means on the back of the carrier,*

*a brace member comprising a U-shaped frame of resilient rod-like material having side arms and a cross piece connecting one end thereof,*

*means pivotally connecting the cross piece of the U-shaped frame with the base member in tension taking relationship, and*

*said frame having laterally extending pins formed at the other end of the arms thereof adapted selectively to engage the lateral sockets of the upper connector means on the back of the carrier,*

*the length of the back of the carrier being being as great as the combined lengths of the base and brace members, and*

[Combination according to claim 1] wherein the base member comprises a second U-shaped frame of resilient rod-like material having second side arms and a second cross piece connecting one end thereof, adjacent portions of said cross pieces being enclosed by said means pivotally connecting said base member and said brace member, said second side arms having laterally extending pins at the other end thereof adapted releasably to engage lateral sockets forming the lower connector means on the back of the carrier, whereby the whole support including both the brace member and the base member can be removed from the rest of the baby carrier,

*the distance separating the uppermost of said lateral sockets from said lower connector means approximating said combined lengths of said brace and base members, whereby when said pins of said side arms are engaged with said uppermost sockets and said lower connector means said support lies against said back,*

*the distance separating said one end of said side arms of each of said frames approximating the width of said carrier, whereby when said pins of said brace member are in a pair of said sockets of the upper*

*connector means below said uppermost sockets and the pins of the base member are in the sockets of said lower connector means, the adjacent cross pieces provide support for the carrier stable with respect to lateral tipping.*

7. Combination according to claim 6 wherein both of said U-frames are of trapezoidal shape with the bases of the trapezoids being formed by the cross pieces of the U-frames, the laterally extending pins at the ends of the arms of both U-frames point inwardly, and the lateral spacing of the sockets on the back of the carrier exceeds the lateral spacing of the ends of the pins on the arms of the U-frames when unstressed.

8. Combination according to claim 6 wherein said back of the carrier includes a pair of rearwardly extending channels extending along the sides thereof, said lower connector means on the back of the carrier, like the upper connector means, including a plurality of pairs of transversely aligned lateral sockets spaced apart along the length of the back, said sockets of both said upper and lower connector means being formed in said channels.

9. Combination of claim 6 wherein said back of the carrier includes an imperforate portion adjacent the bottom of the carrier and a perforated portion thereabove, and said lower connector means on the back of the carrier is formed at the imperforate portion thereof.

10. *A baby carrier comprising:*

*a back with lower and upper connector means on the rear thereof providing at the lower part of the back means for pivotal connection to a support and providing at the portion of the back thereabove a plurality of transversely aligned pairs of lateral sockets spaced apart along the length of the back for selective adjustable connection to a support, and*

*a bottom connected to the back extending forwardly therefrom a substantial distance compared to the length of the back of the carrier,*

*said baby carrier further comprising a support including:*

*a base member having means thereon for making tension-taking pivotal connection with the lower connector means on the back of the carrier,*

*a brace member comprising a U-shaped frame of resilient rod-like material having side arms and a cross piece connecting one end thereof,*

*means pivotally connecting the cross piece of the U-shaped frame with the base member in tension taking relationship, and*

*said frame having laterally extending pins formed at the other end of the arms thereof adapted selectively to engage the lateral sockets of the upper connector means on the back of the carrier,*

*the length of the back of the carrier being as great as the combined lengths of the base and brace,*

*the base member comprises a second U-shaped frame of resilient rod like material having second side arms and a second cross piece connecting one end thereof,*

*adjacent portions of said cross pieces being enclosed by said means pivotally connecting said base member and said brace member,*

*said second side arms having laterally extending pins at the other end thereof adapted releasably to engage lateral sockets forming the lower connector means on the back of the carrier,*

*whereby the whole support including both the brace member and the base member can be removed from the rest of the baby carrier,*

[Combination of claim 6] wherein the distance between the uppermost and lowermost of said lateral sockets equals the combined lengths of said base and brace members.

11. A supporting stand for use with a baby carrier having an elongated back and a bottom connected to the back at the lower end thereof, the carrier including a stand having a first U-shaped frame member and a second U-shaped frame member, said first U-shaped frame member including opposed side arms and a connecting member joining one end of said side arms, said connecting member including an offset portion between said side arms, said offset portion being co-planar with the said connecting member and said side arms, said second U-shaped frame member including opposed second side arms and a second connecting member joining one end of said second side arms, said second connecting member including an offset portion co-planar with the said second connecting member and said second side arms, said connecting members of said first and second U-shaped frame members including portions next to said side arms lying in side by side relation, each said offset portion being between the side by side portions of the respective connecting member, bearing block means enclosing said side by side portions of said connecting members, means connecting the other ends of said side arms of said second frame to said back adjacent to the lower end thereof, said back having a series of spaced transversely aligned apertures therein releasably engaging said side arms of said first mentioned frame member in pivotal relation to said back.

12. Combination according to claim 11 wherein said bearing blocks are each made of resilient material with passage means therethrough receiving said connecting members in pivotal relationship, each block having a bottom portion including co-planar dispersed points adapted to rest on a flat surface.

References Cited by the Examiner

The following references, cited by the Examiner, are of record in the patented file of this patent or the original patent.

UNITED STATES PATENTS

| | | | |
|---|---|---|---|
| 1,447,486 | 3/1923 | Schafer et al. | 267—65 |
| 1,580,344 | 4/1926 | Stillians | 248—195 |
| 1,654,594 | 1/1928 | McAdam | 248—456 |
| 1,694,775 | 12/1928 | Rentos | 220—91 |
| 2,250,026 | 7/1941 | Laukhuff | 5—71 |
| 2,324,421 | 7/1943 | Quellette | 297—325 |
| 2,563,671 | 8/1951 | Basinger | 5—327 |
| 2,614,271 | 10/1952 | Neil | 5—327 |
| 2,663,029 | 12/1953 | Whitley et al. | 5—71 |
| 2,697,480 | 12/1954 | Du Bois et al. | 297—377 |
| 2,777,138 | 1/1957 | Gallagher | 5—327 |
| 2,884,991 | 5/1959 | Bloomquist | 297—377 |
| 2,914,116 | 11/1959 | Gohmann | 108—1 |
| 2,918,682 | 12/1959 | Thoresen et al. | 5—327 |
| 3,018,132 | 1/1962 | Baker et al. | 297—377 |
| 3,041,637 | 7/1962 | Emery | 5—327 |

FOREIGN PATENTS

| | | |
|---|---|---|
| 448,367 | 6/1936 | Great Britain. |
| 463,827 | 4/1937 | Great Britain. |

FRANK B. SHERRY, *Primary Examiner.*

J. S. PETRIE, G. O. FINCH, *Assistant Examiners.*